United States Patent
Cao et al.

(10) Patent No.: US 10,311,341 B1
(45) Date of Patent: Jun. 4, 2019

(54) SYSTEM AND METHOD FOR ONLINE DEEP LEARNING IN AN ULTRA-LOW POWER CONSUMPTION STATE

(71) Applicant: HRL Laboratories, LLC, Malibu, CA (US)

(72) Inventors: Yongqiang Cao, Newton, MA (US); Praveen K. Pilly, West Hills, CA (US); Narayan Srinivasa, Hillsboro, OR (US)

(73) Assignee: HRL Laboratories, LLC, Malibu, CA (US)

( * ) Notice: Subject to any disclaimer, the term of this patent is extended or adjusted under 35 U.S.C. 154(b) by 196 days.

(21) Appl. No.: 15/249,849

(22) Filed: Aug. 29, 2016

Related U.S. Application Data

(63) Continuation-in-part of application No. 15/203,596, filed on Jul. 6, 2016.
(Continued)

(51) Int. Cl.
*H03L 7/26* (2006.01)
*G06K 9/66* (2006.01)
(Continued)

(52) U.S. Cl.
CPC ............ *G06K 9/66* (2013.01); *G06K 9/4628* (2013.01); *G06K 9/6259* (2013.01);
(Continued)

(58) Field of Classification Search
CPC .......... H03K 3/0315; H03K 4/50; G06K 9/00; G06T 5/50; G06T 5/20; G06T 2200/08;
(Continued)

(56) References Cited

U.S. PATENT DOCUMENTS

| 5,355,435 A | 10/1994 | DeYong et al. |
|---|---|---|
| 7,822,698 B1 | 10/2010 | Cruz-Albrecht et al. |

(Continued)

OTHER PUBLICATIONS

Shibata, T., Zhang, R., Levitan, S. P., Nikonov, D. E., & Bourianoff, G. I. (2012). CMOS supporting circuitries for nano-oscillator-based associative memories. In 2012 13th International Workshop on Cellular Nanoscale Networks and Their Applications (CNNA), pp. 1-5.

(Continued)

*Primary Examiner* — Arnold M Kinkead
(74) *Attorney, Agent, or Firm* — Tope-McKay & Associates

(57) ABSTRACT

Described is a system and method for ultra-low power consumption state deep online learning. The system operates by filtering an input image to generate one or more feature maps. The one or more feature maps are divided into non-overlapping small regions with feature values in each small region pooled to generate decreased size feature maps. The decreased size feature maps are divided into overlapping patches which are joined together to form a collection of cell maps having connections to the decreased sized feature maps. The collection of cell maps are then divided into non-overlapping small regions, with feature values in each small region pooled to generate a decreased sized collection of cell maps. The decreased sized collection of cell maps are then mapped to a single cell, which results in a class label being generated as related to the input image based on the single cell.

9 Claims, 10 Drawing Sheets

Related U.S. Application Data

(60) Provisional application No. 62/210,560, filed on Aug. 27, 2015.

(51) Int. Cl.

| | | |
|---|---|---|
| *G06K 9/62* | (2006.01) | |
| *G06K 9/46* | (2006.01) | |
| *G06T 7/00* | (2017.01) | |
| *G06N 3/04* | (2006.01) | |
| *G06N 3/08* | (2006.01) | |
| *G06T 15/20* | (2011.01) | |
| *H03K 4/50* | (2006.01) | |
| *G06T 5/20* | (2006.01) | |
| *H04L 9/12* | (2006.01) | |
| *H04L 9/00* | (2006.01) | |
| *H04N 19/156* | (2014.01) | |
| *G09G 3/20* | (2006.01) | |
| *H03K 3/03* | (2006.01) | |
| *G09G 5/00* | (2006.01) | |

(52) U.S. Cl.
CPC ......... *G06K 9/6265* (2013.01); *G06N 3/0409* (2013.01); *G06N 3/08* (2013.01); *G06T 5/20* (2013.01); *G06T 7/0085* (2013.01); *G06T 15/20* (2013.01); *G09G 3/20* (2013.01); *G09G 5/001* (2013.01); *H03K 3/0315* (2013.01); *H03K 4/50* (2013.01); *H03L 7/26* (2013.01); *H04L 9/001* (2013.01); *H04L 9/12* (2013.01); *H04N 19/156* (2014.11); *G06T 2207/20021* (2013.01); *G06T 2207/20024* (2013.01); *G06T 2207/20081* (2013.01)

(58) Field of Classification Search
CPC . G06T 15/20; H03L 7/26; H03D 7/14; H03M 1/66; H04L 9/12; H04L 9/0838; H04L 9/001; G09G 3/20; G09G 5/001; H04N 19/156
USPC ...... 382/100; 331/143, 2, 46, 57; 706/45, 12
See application file for complete search history.

(56) References Cited

U.S. PATENT DOCUMENTS

| | | | | |
|---|---|---|---|---|
| 9,262,843 | B1* | 2/2016 | Cruz-Albrecht | G06K 9/4604 |
| 9,721,332 | B2 | 8/2017 | Cruz-Albrecht | |
| 2002/0038294 | A1 | 3/2002 | Matsugu | |
| 2016/0189381 | A1* | 6/2016 | Rhoads | G06T 7/33 382/103 |
| 2018/0013439 | A1* | 1/2018 | Pilly | H03M 1/66 |

OTHER PUBLICATIONS

Levitan, S.P., et al., "Non-Boolean Associative Architectures Based on Nano-Oscillators," Proc. Intl. Workshop on Cellular Nanoscale Networks and their Applications, 2012, pp. 1-6.
Levitan, S. P., Fang, Y., Carpenter, J. A., Gnegy, C. N., Janosik, N. S., Awosika-Olumo, S., . . . & Porod, W. (2013). Associative processing with coupled oscillators. In ISLPED, p. 235.
Sermanet, P., Eigen, D., Zhang, X., Mathieu, M., Fergus, R., & LeCun, Y. (2014). Overfeat: Integrated recognition, localization and detection using convolutional networks. In International Conference on Learning Representations (ICLR 2014), Apr. 2014, pp. 1-16.
Krizhevsky, A., Sutskever, I., & Hinton, G. E. (2012). Imagenet classification with deep convolutional neural networks. In Advances in neural information processing systems, pp. 1097-1105.
Fang, et al., "Modeling oscillator arrays for video analytic applications," IEEE/ACM International Conference on Computer-Aided Design (ICCAD), 2014, pp. 86-91.
Jennings, et al., "HMAX Image Processing Pipeline with Coupled Oscillator Acceleration," IEEE Workshop on Signal Processing Systems (SiPS), 2014, pp. 1-22.
D. Chiarulli, B. Jennings, Y. Fang, A. Seel, and S. Levitan, "A Computational Primitive for Convolution based on Coupled Oscillator Arrays," in Proc. of ISVLSI, No. 144, pp. 125-130, 2015.
From U.S. Appl. No. 14/202,200 (now U.S. Pat. No. 9,262,843), Notice of Allowance dated Oct. 6, 2015.
Cao, Y., and Wu, J. (2002). Projective ART for clustering data sets in high dimensional spaces. Neural Networks, 15(1), pp. 105-120.
Cao, Y., and Wu, J. (2004). Dynamics of projective adaptive resonance theory model: the foundation of PART algorithm. IEEE Transactions on Neural Networks, 15(2), pp. 245-260.
Carpenter, G.A., and Grossberg, S. (1987a). A massively parallel architecture for a self-organizing neural pattern recognition machine. Computer Vision, Graphics, and Image Processing, 37, pp. 54-115.
Carpenter, G.A. and Grossberg, S. (1987b). ART 2: Stable self-organization of pattern recognition codes for analog input patterns. Applied Optics, 26 , pp. 4919-4930.
Carpenter, G.A., Grossberg, S., and Rosen, D.B. (1991a). Fuzzy ART: Fast stable learning and categorization of analog patterns by an adaptive resonance system. Neural Networks, 4, pp. 759-771.
Carpenter, G.A., Grossberg, S., and Reynolds, J.H. (1991b). ARTMAP: Supervised real-time learning and classification of nonstationary data by a self-organizing neural network. Neural Networks, 4, pp. 565-588.
Carpenter, G.A., Grossberg, S., Markuzon, N., Reynolds, J.H., and Rosen, D.B. (1992). Fuzzy ARTMAP: A neural network architecture for incremental supervised learning of analog multidimensional maps. IEEE Transactions on Neural Networks, 3, pp. 698-713.
Ciresan, D., Meier, U., & Schmidhuber, J. (2012). Multi-column deep neural networks for image classification. In 2012 IEEE Conference on Computer Vision and Pattern Recognition (CVPR), pp. 3642-3649.
Fukushima, K. (2004). Neocognitron capable of incremental learning. Neural networks, 17(1), pp. 37-46.
Goodfellow, I. J., Mirza, M., Da, X., Courville, A., & Bengio, Y. (2013). An Empirical Investigation of Catastrophic Forgeting in Gradient-Based Neural Networks. arXiv preprint arXiv:1312.6211, pp. 1-9.
Kasturi, R., Goldgof, D., Soundararajan, P., Manohar, V., Garofolo, J., Bowers, R., & Zhang, J. (2009). Framework for performance evaluation of face, text, and vehicle detection and tracking in video: Data, metrics, and protocol. IEEE Transactions on Pattern Analysis and Machine Intelligence, 31(2), pp. 319-336.
LeCun, Y., Bottou, L., Bengio, Y., & Haffner, P. (1998). Gradient-based learning applied to document recognition. Proceedings of the IEEE, 86(11), pp. 2278-2324.
McCloskey, M. & Cohen, N. (1989) Catastrophic interference in connectionist networks: The sequential learning problem. In G. H. Bower (ed.) The Psychology of Learning and Motivation, 24, pp. 109-164.
Mutch, J., & Lowe, D. G. (2006). Multiclass object recognition with sparse, localized features. In 2006 IEEE Computer Society Conference on Computer Vision and Pattern Recognition, vol. 1, pp. 11-18.
Ratcliff, R. (1990) Connectionist models of recognition memory: Constraints imposed by learning and forgetting functions. Psychological Review, 97, pp. 285-308.
Riesenhuber, M., & Poggio, T. (1999). Hierarchical models of object recognition in cortex. Nature neuroscience, 2(11), pp. 1019-1025.
Russakovsky, O., Deng, J., Su, H., Krause, J., Satheesh, S., Ma, S., . . . & Fei-Fei, L. (2014). ImageNet Large Scale Visual Recognition Challenge. arXiv preprint arXiv:1409.0575, pp. 1-43.
Serre, T., Oliva, A., & Poggio, T. (2007). A feedforward architecture accounts for rapid categorization. Proceedings of the National Academy of Sciences, 104(15), pp. 6424-6429.
Zeiler, M. D., & Fergus, R. (2013). Visualizing and understanding convolutional neural networks. arXiv preprint arXiv:1311.2901, pp. 1-11.
Notice of Allowance for U.S. Appl. No. 15/203,596, dated Feb. 13, 2018.

(56) References Cited

OTHER PUBLICATIONS

Narayanan, et al., "Video analytics using beyond DMOS devices," In: Proceedings of the conference on 2014 Design, Automation & Test in Europe, European Design and Automation Association, pp. 24-28, Mar. 2014.

Nikonov, et al., "Convolutional networks for image processing by coupled oscillator arrays," pp. 1-23, Sep. 15, 2014.

International Search Report and Written Opinion for PCT/US2017/040779, dated Oct. 19, 2017.

* cited by examiner

| $\sigma_l$ | 1 | Eq. (4) |
| $\sigma_s$ | 0.5 | Eq. (4) |
| $\theta$ | $0, \frac{\pi}{4}, \frac{\pi}{2}, \frac{3\pi}{4}$ | Eqs. (5), (6) |
| $\alpha$ | 5 | Eq. (7) |
| $\beta$ | 0 | Eq. (2) |
| $\gamma$ | 3 | Eq. (3) |
| $\rho$ | 0.15 | Fig. 2 |
| $\rho^*$ | 1 | Fig. 4 |

FIG. 10

SYSTEM AND METHOD FOR ONLINE DEEP LEARNING IN AN ULTRA-LOW POWER CONSUMPTION STATE

CROSS-REFERENCE TO RELATED APPLICATIONS

This is a Continuation-in-Part application of U.S. application Ser. No. 15/203,596 filed Jul. 6, 2016, titled, "Method to perform convolutions between arbitrary vectors using clusters of weakly coupled oscillators", the entirety of which is hereby incorporated by reference.

This is ALSO a non-provisional patent application of U.S. Provisional Application No. 62/210,560, filed on Aug. 27, 2015, the entirety of which is hereby incorporated by reference.

GOVERNMENT RIGHTS

This invention was made with government support under U.S. Government Contract Number HR0011-13-C-0052. The government has certain rights in the invention.

BACKGROUND OF INVENTION

(1) Field of Invention

The present invention relates to a system and method for ultra-low power consumption state deep online learning and, more specifically, to an incremental online deep learning method that can be readily implemented in hardware with ultra-low power consumption.

(2) Description of Related Art

Deep learning is a form of machine learning based on a set of algorithms that model high-level abstractions in data by using a deep graph with multiple processing layers. Deep learning in networks, for example, includes convolutional neural networks (CNN), Hierarchical Model and X (HMAX), and Neocognitron. In the field of machine learning, incremental learning is a paradigm where learning occurs whenever new material is provided to allow the machine to continually adjust the learning process based on new material. While they provide deep learning, both CNN and HMAX are not incremental online learning methods in their current forms. Alternatively, a variant of Neocognitron is capable of incremental learning, but it has its own disadvantages. These deep learning processes are described in further detail below.

As a gradient-based backpropagation network, CNN faces a catastrophic forgetting problem (see the List of Incorporated Literature References, Reference Nos. 10, 15 and 17). In short, catastrophic forgetting is that the old information is erased abruptly when trying to learn new information. As a result, CNN does not provide incremental learning.

On the other hand, HMAX uses unsupervised learning except the last layer where a support vector machine (SVM) is usually used. A disadvantage of HMAX is that it needs a lot of units for coding features. For example, ten million tuned units were used in the HMAX process as descrobed by Serre et al. (See Literature Reference No. 21). Further, incremental online learning does not work well with SVM.

In other art, Fukushima (See Literature Reference No. 9) proposed a variant of the Neocognitron model that is capable of incremental learning; however, the equations used by the model for cell responses and weight updates are complex and may not be easy to implement in low power hardware. Also the model is only tested for handwritten numeral recognition. The recognition performance for complex images is unknown.

In recent years, deep-learning neural networks have shown great performance advantages over other machine learning approaches in vision tasks, winning several high-profile machine learning competitions. For example, teams using CNN (convolutional neural networks; See Literature Reference No. 8) won famous ILSVRC competition (ImageNet Large Scale Visual Recognition Challenge) in a row from 2012 to 2014 (See Literature Reference Nos. 7, 23, 20, and 21). Ciresan et al. (See Literature Reference No. 8) won the final phase of the German traffic sign recognition benchmark and achieved a better-than-human recognition rate of 99.46%.

Despite the recent successes of deep neural networks, achieving incremental online learning in a deep neural network is still an open problem. As noted above, incremental learning is a machine learning approach where the learning process takes place whenever new examples emerge and updates what has been learned according to the new examples. The most prominent differences of incremental learning from traditional machine learning is that it does not assume the availability of a sufficient training set before the learning process, but the training examples appear over time. The incremental learning does not destroy old learned information when new information is learned. Incremental online learning is useful for many applications where data and environment change constantly such as autonomous robot and intelligent UAVs.

Thus, a continuing need exists for a system that performs incremental online deep learning and that can be readily implemented in hardware with ultra-low power consumption.

SUMMARY OF INVENTION

Described is a system for deep online learning that can be readily implemented in hardware with ultra-low power consumption. In various embodiments, the system includes one or more processors and a memory. The memory is, for example, a non-transitory computer-readable medium having executable instructions encoded thereon, such that upon execution of the instructions, the one or more processors perform several operations, such as filtering an input image to generate one or more feature maps, each feature map having feature values; dividing the one or more feature maps into non-overlapping small regions and pooling the feature values in each small region to generate decreased size feature maps; dividing the decreased size feature maps into overlapping patches, with the overlapping patches being joined together such that overlapping patches centered at a same position across all decreased size feature maps are joined together to connect with a single cell in the same position, with all of the single cells collectively forming a collection of cell maps having connections to the decreased sized feature maps; dividing the collection of cell maps into non-overlapping small regions and pooling feature values in each small region to generate a decreased sized collection of cell maps; mapping the decreased sized collection of cell maps to a single cell; and generating a class label as related to the input image based on the single cell.

In another aspect, a degree-of-match generator is included that comprises a plurality of weakly coupled oscillators for generating a degree-of-match between an input vector and a template. Further, in forming a collection of cell maps, cells in the same position across decreased size feature maps compete for a winner through the degree-of-match, such that if the winner matches the input vector, a template corresponding to the winner is updated, otherwise a new feature map in the decreased size feature maps is used to represent an input template.

In yet another aspect, mapping the decreased collection of cell maps to a single cell is performed using an ARTMAP inference module, the ARTMAP inference module mapping the decreased collection of cell maps to a single cell by performing operations of:
- checking whether a winner label matches an input data label;
  - if they match, then updating a template corresponding to the winner;
  - otherwise, retrieving a degree-of-match from the degree-of-match generator and checking whether the degree of match for the winner is greater than a threshold;
    - if so, then doing nothing; and
    - otherwise, using a new cell to represent the input template and attach the input data label to it.

In another aspect, a Gabor filter is used to filter the input image.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 10 is a table including example parameters according to various embodiments of the present invention.

DETAILED DESCRIPTION

Figure 1:
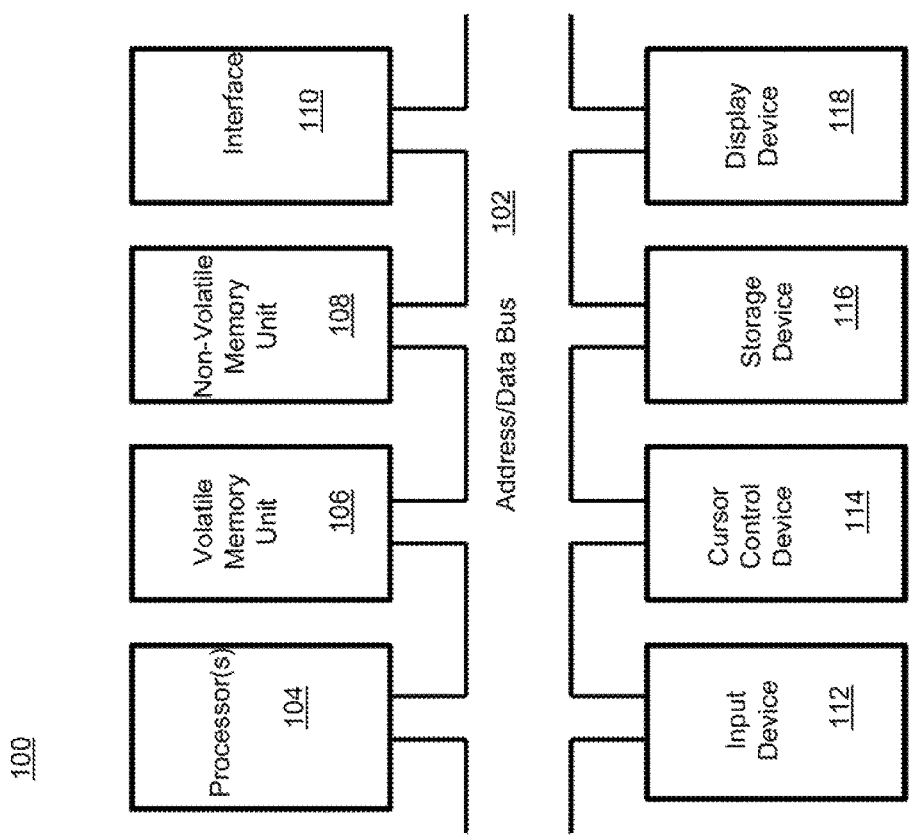
FIG. 1 is a block diagram depicting the components of a system according to various embodiments of the present invention.

The present invention relates to a system and method for ultra-low power consumption state deep online learning and, more specifically, to an incremental online deep learning method that can be readily implemented in hardware with ultra-low power consumption. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, specific details of various embodiment of the present invention are provided to give an understanding of the specific aspects.

(1) List of Incorporated Literature References

The following references are cited throughout this application. For clarity and convenience, the references are listed herein as a central resource for the reader. The following references are hereby incorporated by reference as though fully set forth herein. The references are cited in the application by referring to the corresponding literature reference number.

1. Cao, Y., and Wu, J. (2002). Projective ART for clustering data sets in high dimensional spaces. *Neural Networks*, 15(1), 105-120.
2. Cao, Y., and Wu, J. (2004). Dynamics of projective adaptive resonance theory model: the foundation of PART algorithm. *IEEE Transactions on Neural Networks*, 15(2), 245-260.

3. Carpenter, G. A., and Grossberg, S. (1987a). A massively parallel architecture for a self-organizing neural pattern recognition machine. *Computer Vision, Graphics, and Image Processing,* 37, 54-115.
4. Carpenter, G. A. and Grossberg, S. (1987b). ART 2: Stable self-organization of pattern recognition codes for analog input patterns. *Applied Optics,* 26, 4919-4930.
5. Carpenter, G. A., Grossberg, S., and Rosen, D. B. (1991a). Fuzzy ART: Fast stable learning and categorization of analog patterns by an adaptive resonance system. *Neural Networks,* 4, 759-771.
6. Carpenter, G. A., Grossberg, S., and Reynolds, J. H. (1991b). ARTMAP: Supervised real-time learning and classification of nonstationary data by a self-organizing neural network. *Neural Networks,* 4, 565-588.
7. Carpenter, G. A., Grossberg, S., Markuzon, N., Reynolds, J. H., and Rosen, D. B. (1992). Fuzzy ARTMAP: A neural network architecture for incremental supervised learning of analog multidimensional maps. *IEEE Transactions on Neural Networks,* 3, 698-713.
8. Ciresan, D., Meier, U., & Schmidhuber, J. (2012). Multi-column deep neural networks for image classification. In *2012 IEEE Conference on Computer Vision and Pattern Recognition (CVPR),* (pp. 3642-3649).
9. Fukushima, K. (2004). Neocognitron capable of incremental learning. *Neural networks,* 17(1), 37-46.
10. Goodfellow, I. J., Mirza, M., Da, X., Courville, A., & Bengio, Y. (2013). An Empirical Investigation of Catastrophic Forgetting in Gradient-Based Neural Networks. *arXiv preprint arXiv:* 1312.6211.
11. Kasturi, R., Goldgof, D., Soundararajan, P., Manohar, V., Garofolo, J., Bowers, R., & Zhang, J. (2009). Framework for performance evaluation of face, text, and vehicle detection and tracking in video: Data, metrics, and protocol. *IEEE Transactions on Pattern Analysis and Machine Intelligence,* 31(2), 319-336.
12. Krizhevsky, A., Sutskever, I., & Hinton, G. E. (2012). Imagenet classification with deep convolutional neural networks. In *Advances in neural information processing systems* (pp. 1097-1105).
13. LeCun, Y., Bottou, L., Bengio, Y., & Haffner, P. (1998). Gradient-based learning applied to document recognition. *Proceedings of the IEEE,* 86(11), 2278-2324.
14. Levitan, S. P., Fang, Y., Carpenter, J. A., Gnegy, C. N., Janosik, N. S., Awosika-Olumo, S., . . . & Porod, W. (2013). Associative processing with coupled oscillators. In *ISLPED* (p. 235).
15. McCloskey, M. & Cohen, N. (1989) Catastrophic interference in connectionist networks: The sequential learning problem. In G. H. Bower (ed.) *The Psychology of Learning and Motivation,* 24, 109-164.
16. Mutch, J., & Lowe, D. G. (2006). Multiclass object recognition with sparse, localized features. In *2006 IEEE Computer Society Conference on Computer Vision and Pattern Recognition,* (Vol. 1, pp. 11-18).
17. Ratcliff, R. (1990) Connectionist models of recognition memory: Constraints imposed by learning and forgetting functions. *Psychological Review,* 97, 285-308.
18. Riesenhuber, M., & Poggio, T. (1999). Hierarchical models of object recognition in cortex. *Nature neuroscience,* 2(11), 1019-1025.
19. Russakovsky, O., Deng, J., Su, H., Krause, J., Satheesh, S., Ma, S., . . . & Fei-Fei, L. (2014). ImageNet Large Scale Visual Recognition Challenge. *arXiv preprint arXiv:* 1409.0575.
20. Sermanet, P., Eigen, D., Zhang, X., Mathieu, M., Fergus, R., & LeCun, Y. (2014). Overfeat: Integrated recognition, localization and detection using convolutional networks. In *International Conference on Learning Representations (ICLR 2014),* April 2014.
21. Serre, T., Oliva, A., & Poggio, T. (2007). A feedforward architecture accounts for rapid categorization. *Proceedings of the National Academy of Sciences,* 104(15), 6424-6429.
22. Shibata, T., Zhang, R., Levitan, S. P., Nikonov, D. E., & Bourianoff, G. I. (2012). CMOS supporting circuitries for nano-oscillator-based associative memories. In *2012 13th International Workshop on Cellular Nanoscale Networks and Their Applications (CNNA),* (pp. 1-5).
23. Zeiler, M. D., & Fergus, R. (2013). Visualizing and understanding convolutional neural networks. *arXiv preprint arXiv:* 1311.2901.

(2) Principal Aspects

Various embodiments of the invention include three "principal" aspects. The first is a system for ultra-low power consumption state online deep learning. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
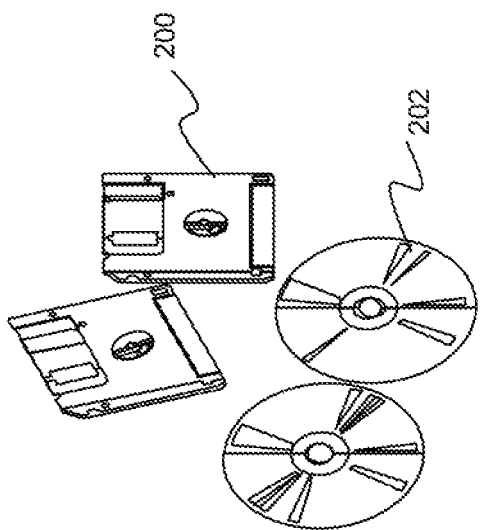
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of Various Embodiments

This disclosure provides an incremental online deep learning method and system that can be readily implemented in hardware with ultra-low power consumption. Despite recent successes of deep neural networks, achieving incremental online learning in a deep neural network is a highly challenging open problem. This disclosure describes how to incorporate variants of adaptive resonance theory (ART) and ARTMAP neural networks as inference modules (IM) to enable deep learning with comparable performance accuracy. This approach lends itself to implementation using low power hardware while also being capable of adapting online. As can be appreciated by those skilled in the art, incremental online learning is useful for many applications where data and environment change constantly, non-limiting examples of which include as autonomous robots and intelligent UAVs. Specific details regarding the various embodiments of the present invention are provided below.

(3.1) ART Neural Network

The system of the present invention is inspired by ART (See Literature Reference Nos. 4, 5, and 6) neural networks. An ART neural network is an unsupervised incremental on-line learning model that self-organizes recognition categories in real-time and achieves automatic data compression by grouping similar inputs together. It turns out ART architecture is very easily implemented in an inference module (IM) with oscillators, and hence allows the system of the present invention to be easily implemented in emergent hardware.

Figure 3:
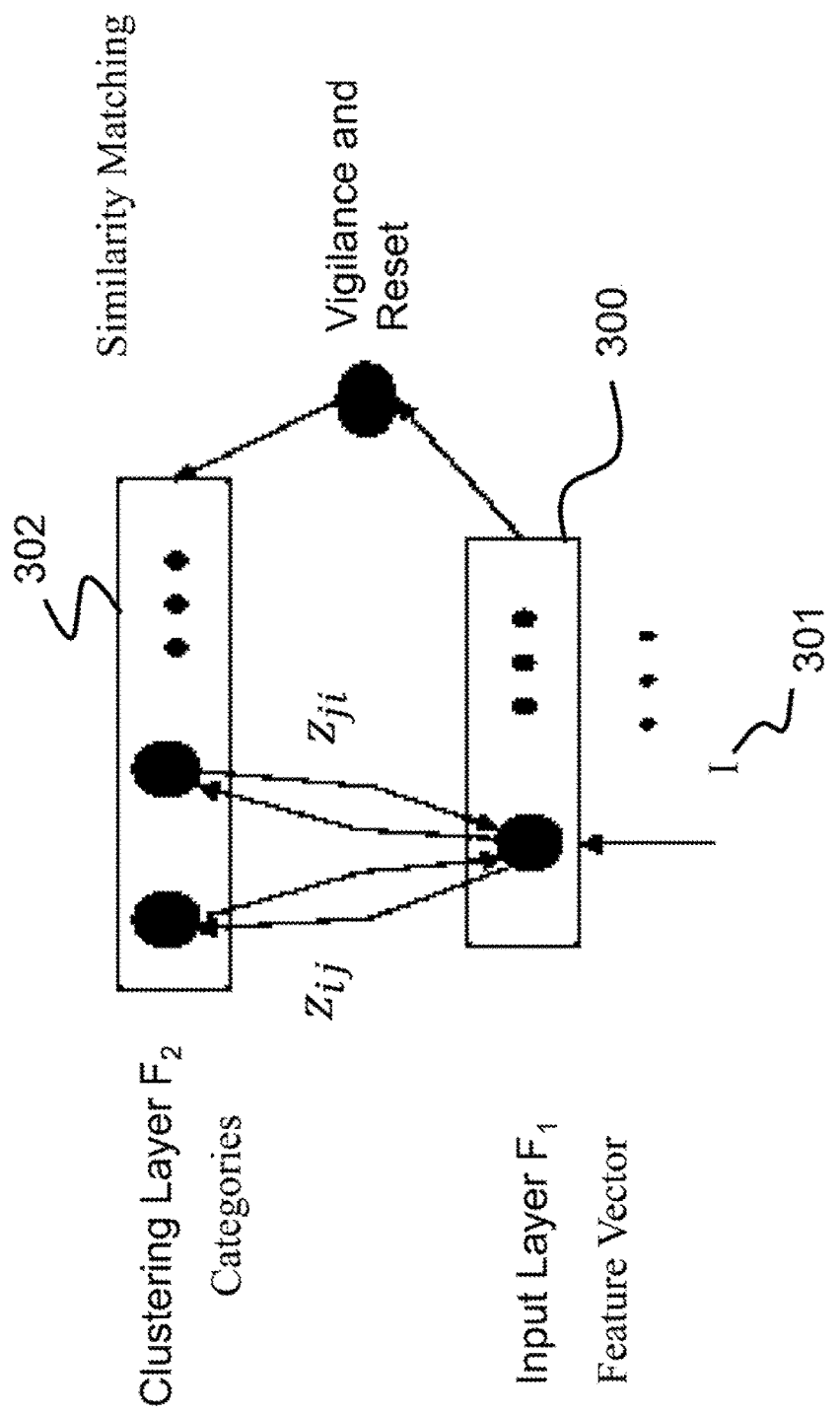
FIG. 3 is a diagram depicting simplified Adaptive Resonance Theory (ART) architecture according to various embodiments of the present invention.

FIG. 3, for example, depicts shows a simplified ART architecture. The number of nodes in the input layer F1 300 is the same as the dimensions of the input vector 301, with each node denoting one dimension. F1 300 can be more complicated than shown in FIG. 3 when applying to high-dimensional data clustering (see Literature Reference Nos. 1 and 2). Each node in F2 302 can represent a category or sub-category. The F2 layer 302 is a clustering or competitive layer. The node with the largest bottom-up input becomes the winner. If the template of the winner matches the input data (i.e., there are enough similarities), then weights of the winner node are updated according to ART learning rules. The weights of other nodes kept unchanged. If the input data is a new category with no matches with existing nodes, then a new node is added to the F2 layer 302. Whether the winner matches the input data is determined by a match function and a vigilance parameter (usually denoted as φ. The match function measures the similarity of the winner template and input data. A match is found if the similarity is higher than or equal to the vigilance parameter ρ. A search process can occur if the winner doesn't match the input data. In other words, the activity of the winner node is reset to zero and then the node with the second largest input becomes the winner. This search process can repeat until a match is found or all existing nodes have been checked for matching. However, this search process can be omitted in a special case where the similarity match function is the same as the choice function that defines the total input to a F2 layer 302 node. The special case is used here and hence avoids the expensive search process.

In FIG. 3, zij is the bottom-up connection weight, and zji is the top-down connection weight that stores the template of a category. Both weights can be learned according to ART learning rules which can vary in different ART variants. Bottom-up weights can be the same as top-down weights in some ART variants.

(3.2) Implement ART Neural Network in IM Module

Figure 4:
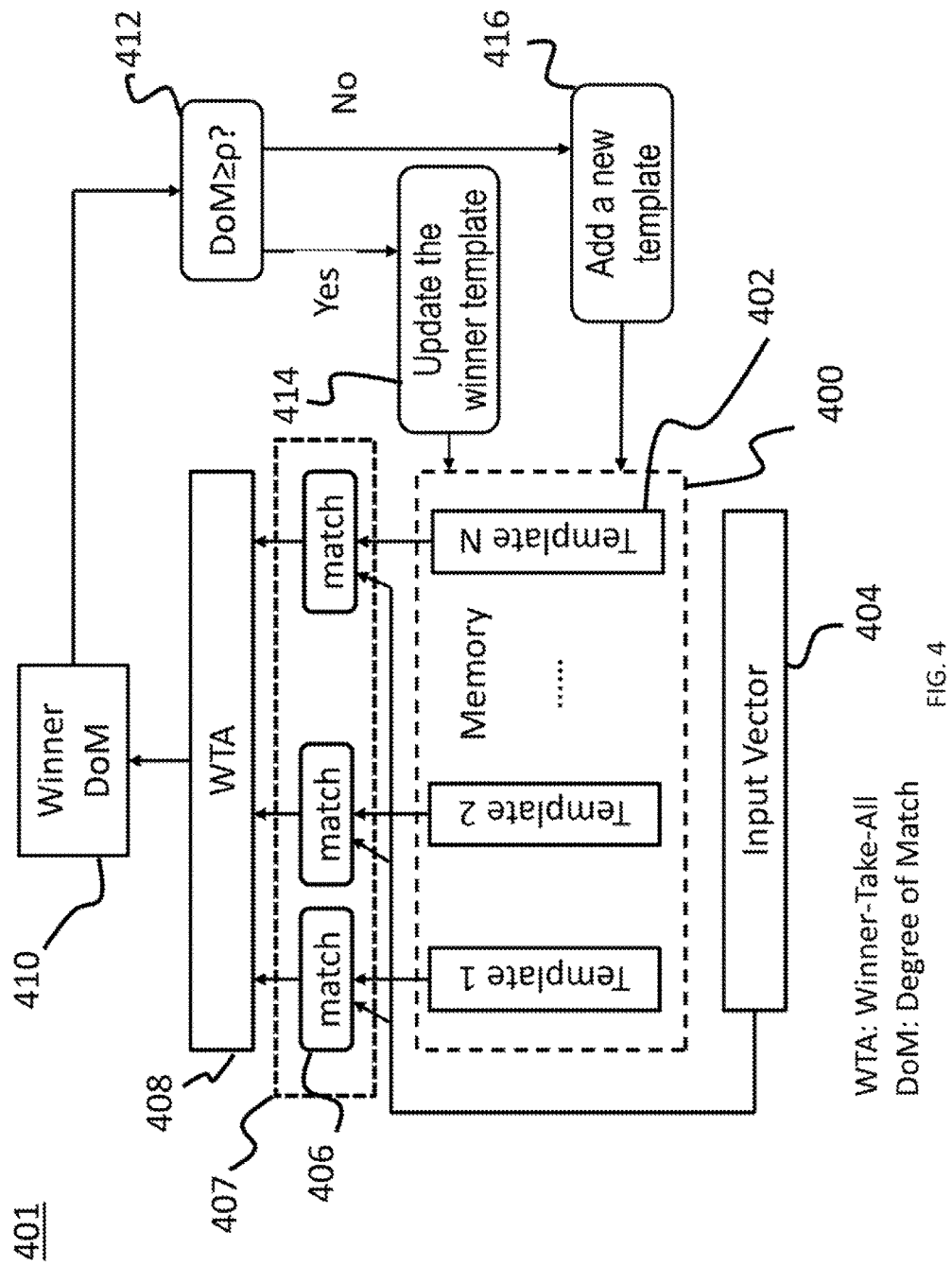
FIG. 4 is a diagram depicting an inference module for an ART neural network according to various embodiments of the present invention.

This section describes how an ART neural network can be implemented in an IM with weakly coupled oscillators. FIG. 4 shows a diagram of the ART IM module 401, in which the memory component 400 stores all learned templates 402. The Degree of Match (DoM) between the input vector 404 and templates 402 is produced by a plurality of weakly coupled oscillators 406 (by, for example, a DoM generator 407 comprising such oscillators 406), and then a WTA (winner-take-all) module 408 selects the best match as the winner DoM 410. The process for generating the DoM (via the DoM generator 407) by a plurality of weakly coupled oscillators 406 is described, for example, in U.S. application Ser. No. 15/203,596 filed Jul. 6, 2016, titled, "Method to perform convolutions between arbitrary vectors using clusters of weakly coupled oscillators", the entirety of which is hereby incorporated by reference.

The winner's degree of match (DoM) 410 is compared 412 with a vigilance parameter p. If the DoM is greater than or equal to p, then the winner template is updated 414 according to certain ART learning rule. Otherwise, a new template is added 416. In particular, the following learning rule can be used in the ART IM module. When a new template T is added 416, it is simply defined as the input vector I:

$$T = I. \quad (1)$$

When the winner is an existing template T that matches the input, it is updated 414 as follows:

$$T^{new} = \beta I + (1-\beta) T^{old}, \quad (2)$$

where $0 \leq \beta \leq 1$ is a learning rate.

This match process implemented in a DoM generator (e.g., the plurality of oscillators 406) and can be achieved using emergent hardware based on weakly coupled nano-oscillators (See, for example, Literature Reference Nos. 22 and 14 for a description of such oscillators) and, without implying a limitation, as described in U.S. patent application Ser. No. 15/203,596 as referenced above. In particular, in the simulation, the match function is defined as follows:

$$DoM(T, I) = \exp\left(-\gamma \sqrt{\frac{1}{n} \sum_{i=1}^{n} (I_i - T_i)^2}\right), \quad (3)$$

where γ=3 is a constant. The match function approximates the behavior of the averager in an oscillators cluster. Since data categorization by WTA is an ordinal process, the exact format of match function does not matter very much. A similar result can be obtained from any function which is decreasing with the distance of I and T.

(3.3) ARTMAP Neural Network and its Implementation in IM Module

Figure 5:
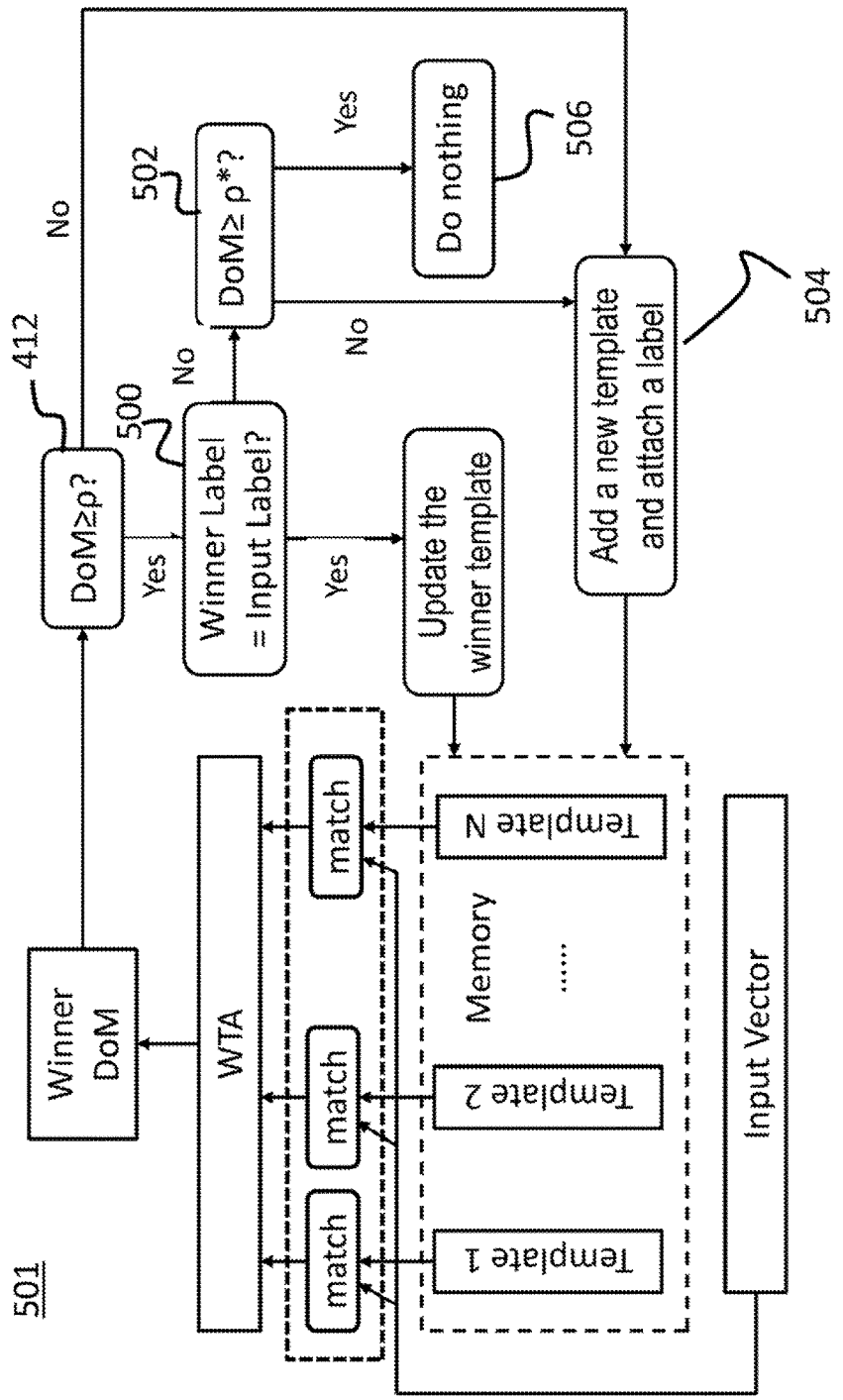
FIG. 5 is a diagram depicting an inference module for ARTMAP neural network according to various embodiments of the present invention.

ARTMAP (See Literature Reference Nos. 6 and 7) is a supervised neural network that maps labels of input data to ART categories that it generates. A label is, for example, the name of a class or category of an item or object. FIG. 5 shows a diagram of an ARTMAP IM module 501 that can be used in the online learning system as described herein. In addition to the components in ART IM (as shown in FIG. 4), the ARTMAP IM 501 adds a label component 500 to compare whether the winner label matches the input label. If yes, then the winner template is updated 414 as was the case above. Alternatively, the architecture in FIG. 5 includes a new compare module 502 that checks whether the winner DoM is greater than or equal to ρ* when the winner label does not match the input label. If the answer is no, then a new template is added (using the process as described above with respect to FIG. 4) and a corresponding label is attached 504. If the answer is yes, then nothing 506 is done.

As an example, the input data may include a photo of a car, then the ARTMAP IM 501 adds a label (during label component 500) to the photo, indicating that the photo includes a car. Thus, in this non-limiting example, the label is "car".

Here ρ* is a big enough number but not greater than the maximum DoM. The compare module 502 deals with training data with incorrect or inconsistent labels. In other words, if the DoM is greater than or equal to ρ* and the winner label does not match the input label, then there are incorrect or inconsistent labels. For example, in a training data set there are two records with the same features but different labels. Of course, this is an error in the training dataset. But such training dataset with labeling errors can exist in reality due to the mistake of human or machine that creates it. In particular, quantization can make two records across the class boundary become the same in extreme case. The compare module 502 prevents ARTMAP from generating two categories with the same templates but different labels, and hence stops possible category proliferation when there are labeling errors in a training dataset. Otherwise, a category proliferation can occur in the extreme case due to the search process initiated by the ARTMAP model is omitted for efficiency here.

Figure 6:
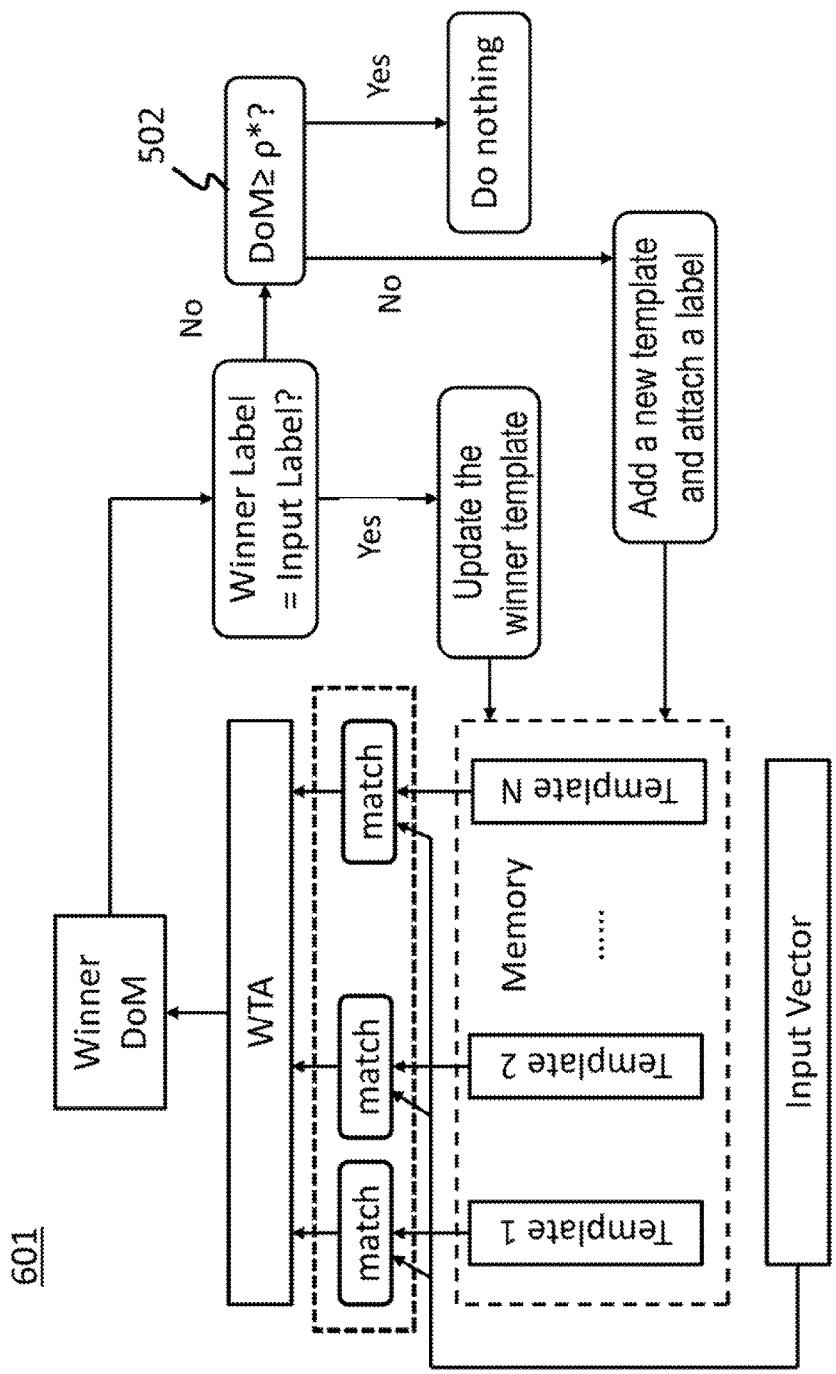
FIG. 6 is a diagram depicting a reduced ARTMAP architecture according to various embodiments of the present invention.
Figure 7:
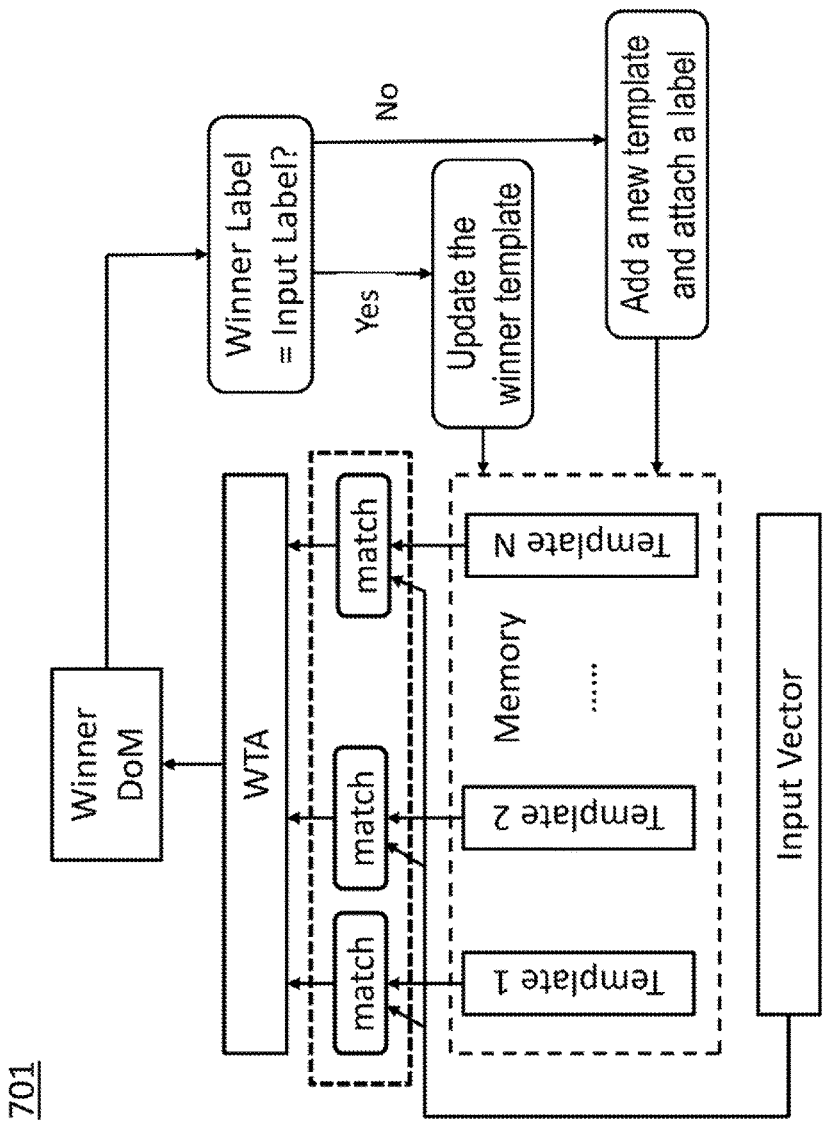
FIG. 7 is a diagram depicting a further reduced ARTMAP architecture according to various embodiments of the present invention.

In the ARTMAP IM 501 architecture shown in FIG. 5, vigilance parameter p can often be set to zero. As a result, the architecture can be reduced as in FIG. 6. The reduced ARTMAP IM 601 architecture as shown in FIG. 6 does not include the compare process, depicted as element 412 in FIGS. 4 and 5. When it is determined (e.g., via user knowledge, etc.) that there are no inconsistent labels in training datasets, the architecture of FIG. 6 can be further reduced, as shown in FIG. 7 as the further reduced ARTMAP IM 701 architecture (in instances when it is not known that there are no inconsistent labels, FIG. 7 cannot be used, leaving, for example, use of the architecture of FIG. 6. The further reduced ARTMAP IM 701 architecture of FIG. 7 does not include the compare module 502 as found in FIGS. 5 and 6. The ARTMAP IM 701 of FIG. 7 can use the same learning rule to update the templates as the ART IM module (of FIG. 4) does.

(3.4) Incremental Online Deep Learning Model

Figure 8:
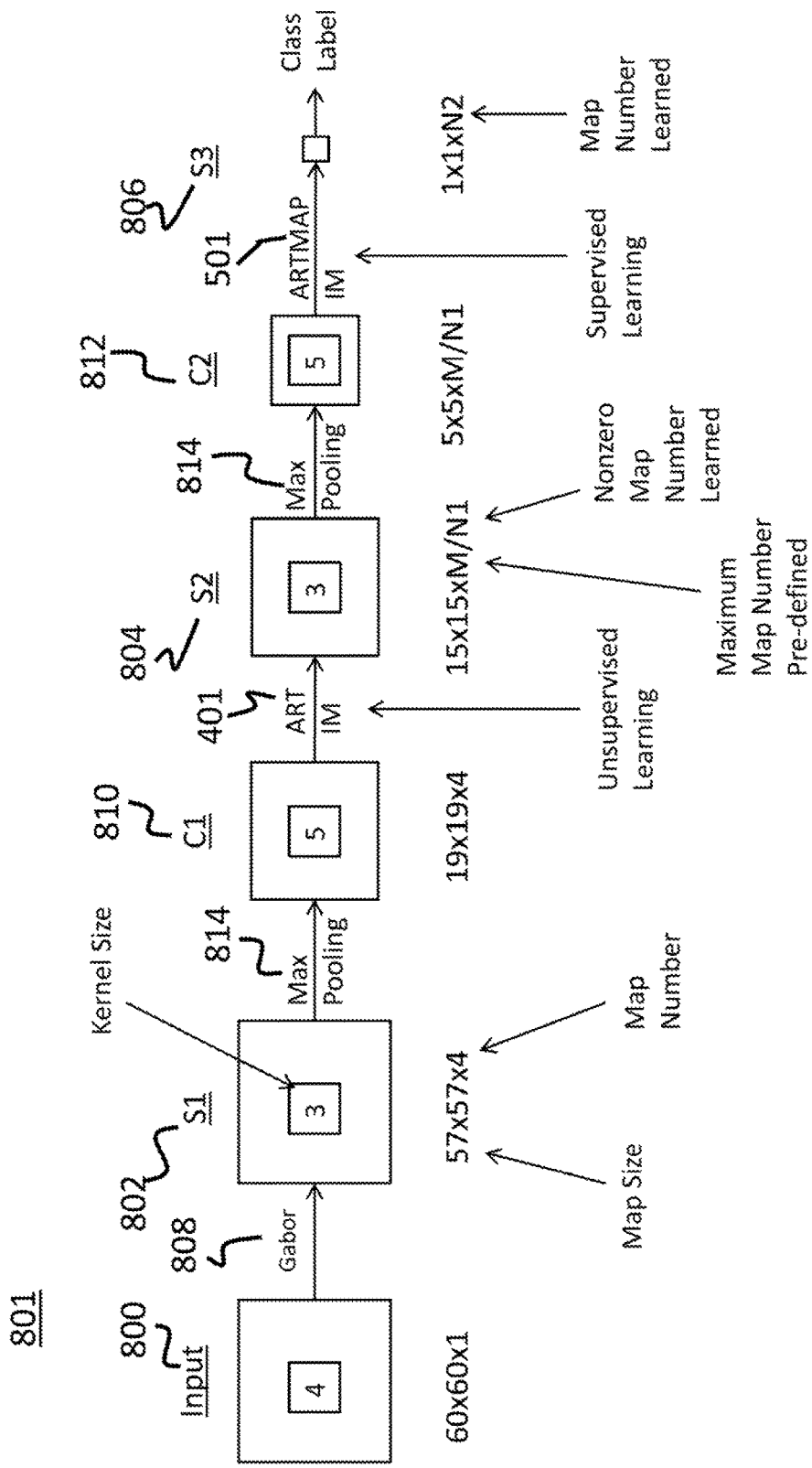
FIG. 8 is a diagram of an incremental online deep learning model according to various embodiments of the present invention.

FIG. 8 provides a diagram of the incremental deep learning model 801 according to various embodiments of the present invention. It has 6 layers including the input layer 800. The S1 802, S2 804 and S3 806 are simple cell layers in which features in a preceding layer are joined together to form more complicated features. The joining processes are computed by a Gabor filter 808 (from Input 800 to S1 802), an ART IM 401 (from C1 to S2) and an ARTMAP IM 501 (from C2 to S3). C1 810 and C2 812 are complex cell layers, in which the same feature in nearby spatial positions in a preceding layer are pooled together by a max operation (max-pooling 814) in a manner similar to an HMAX model. The numbers in small rectangles are example kernel sizes. For example, the number 3 in the S1 layer 802 denotes the kernel size of max-pooling 814 from S1 802 to C1 810 is 3×3. The numbers under the large rectangles are the sizes and numbers of feature maps. For example, the number 57×57×4 in the S1 layer 802 denotes it has 4 feature image maps each of which has size 57×57. As can be appreciated by those skilled in the art, these numbers are changeable according to applications.

(3.4.1) Input Layer

The input layer 800 is any suitable input. For example, the input in the example as shown in FIG. 8 is a grayscale image of size 60×60. As can be appreciated by those skilled in the art, the model is not limited by the size of the grayscale image. As another example, the input 800 could be a color image of size 60×60×3, which can then be converted to grayscale using any suitable image processing process.

(3.4.2) Gabor Filter

The Gabor filter 808 detects edges of an input image 800. Edge detectors can be defined in several ways. Though all of them can be used in this model, here the Gabor filter G is defined (as a non-limiting example) as the difference of two center-shifted Gaussians:

$$G = N\left[\exp\left(-\left(\frac{x'^2}{2\sigma_l^2} + \frac{\left(y' + \frac{\sigma_s}{2}\right)^2}{2\sigma_s^2}\right)\right) - \exp\left(-\left(\frac{x'^2}{2\sigma_l^2} + \frac{\left(y' - \frac{\sigma_s}{2}\right)^2}{2\sigma_s^2}\right)\right)\right], \quad (4)$$

where N is a normalization number that makes the filter has an absolute sum one, $\sigma_l > \sigma_s$, and x' and y' are defined as:

$$x' = x \cos\theta - y \sin\theta, \quad (5)$$

$$y' = x \sin\theta + y \cos\theta, \quad (6)$$

where θ is the orientation. In the model shown in FIG. 8, four orientations are used.

The feature maps in S1 layer can then be obtained by the absolute of the convolution of input image and Gabor filters, as $$S1 = \alpha |\text{conv}(\text{Input}, G)|, \quad (7)$$

where α is a scaling parameter. Note that the absolute function is used here to get image edges in both contrast polarities.

In a simulation, a 4×4 Gabor filter size was used, in which x and y are sampled at x, y=−1.5, −0.5, 0.5, 1.5 with $\sigma_l$=1 and $\sigma_s$=0.5. Four orientations are at θ=0, π/4, π/2, 3π/4, (3.4.3) Max-Pooling (to Layer C1)

In max-pooling 814, the S1 802 maps are divided into non-overlapping (e.g., 3×3 pixel) small regions. Then, feature values in a small region are pooled together in C1 810 by taking the maximum of them (i.e., taking the maximum number of all values). As a result, the size of a C1 810 map is reduced by 3 times. In other words, the C1 810 map is a decreased size feature map.

(3.4.4) ART IM

Figure 9:
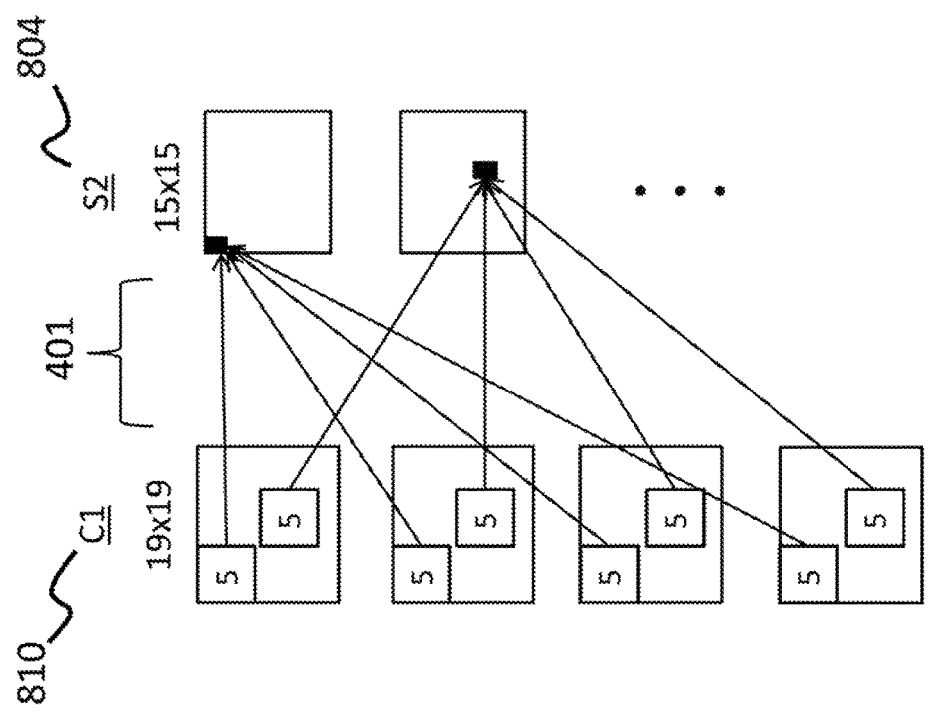
FIG. 9 is an expanded circuit diagram of the ART module according to various embodiments of the present invention.

FIG. 9 shows an example of an expanded circuit diagram of the ART IM 401, showing layer S2 804 with connections from C1 810. During the ART IM 401 process, an expected maximum number of feature maps can be pre-defined in the S2 layer 804. The process includes dividing a C1 810 map (e.g., of size 19×19 pixels or cells) into overlapping patches (e.g., 5×5) at stride one, resulting in patches (e.g., 15×15) for each C1 810 map. The patches at the same position across all four feature maps in C1 810 are joined together to connect with one cell in the same position in a S2 804 map. Therefore, in this example, there are 15×15 cells in a S2 804 map and each cell has 100 (5×5×4) connections with C1 810 maps. Initially all connection weights are zeros.

Thus, in the example as shown in FIG. 9, all cells in a S2 804 map share the same weights that connect with C1 810. In other words, a S2 804 map is corresponding to a template in the ART IM 401 module. Thus, the S2 804 map is a collection of cell maps. Cells in the same position across feature maps compete for the winner. If the winner matches the input, its template can be updated. Otherwise, a new feature map in S2 804 is recruited to represent the input template.

When a training image is presented to the network, as aforementioned, it will generate four C1 810 feature maps, each of which is divided into 15×15 patches of size 5×5 (i.e., pixels). The patches at the same position across all four feature maps in C1 810 are joining together to form an input vector of 100 (5×5×4 pixels) dimensions to an ART IM 401 module, in which it is matched with all previously learned templates for feature maps in S2 804. However, if the input vector is all zeros it is simply ignored. For every nonzero input vector, a new feature map in S2 804 is recruited if it is the first nonzero input vector or it does not match the templates of those previously learned feature maps. When a new S2 804 feature map is recruited, all its cells share a same template (weights) that is learned from the input vector. If the input vector matches a previously learned feature map, the template of the feature map can be updated with new information from the input vector, as defined by Eq. (2) above.

The activity of a S2 804 layer cell is determined by matching its template weights with the local input vector of 100 dimensions (see Eq. (3) above), and then thresholded by the vigilance parameter p. See the Quantization description below for other details.

(3.4.5) Max-Pooling (to Layer C2)

As shown in FIG. 8, max pooling 814 occurs from layer S2 804 to C2 812. The same pooling method as described above in Section 3.4.3 is used here. See Section 3.4.3 for details.

(3.4.6) ARTMAP IM

Each map in the S3 806 layer has only one cell, which has a full connection with C2 812 layer cells. As a result, the input vector to an ARTMAP IM 501 module is 5×5×M dimensions, in which 5×5×N1 dimensions can have nonzero values and remaining 5×5×(M−N1) dimensions are all zeros. Here M is the maximum map number pre-defined in the S2 804 layer and N1 is the number of S2 804 feature maps incrementally learned. N1 will grow with training image samples until a limiting point or maximum number M is reached. The limiting point can be all possible feature templates in the S2 804 layer. It was shown in experimental results that the growing rate of N1 drops dramatically with training samples.

An expected maximum number of maps can be pre-defined in layer S3 806 as the same way as in layer S2 804, with zero initial connection weights. The learned feature maps in the S3 806 layer also grows with training samples, but at a gradually slowing rate. The template learning rule and match function can be the same as in the ART IM 401 process, with the ARTMAP architecture in FIG. 6 being used here.

(4.1) Quantization

In order to reduce computing cost and save hardware resource, quantization is performed in the S1 802 and S2 804 layers. In particular, in the Gabor filter layer 808, the resulting features from Eq. (7) is binarized. For example, a threshold, such as 0.2, can be used with $\alpha=5$.

In the ART IM module 401, the activity of a cell in a S2 804 map is first determined by the match of its template weights with the local input vector. The match function is defined in Eq. (3). If the activity is below the vigilance $\rho$, then it is reset to zero. For example, $\rho=0.15$ can be used. Otherwise, in this example, it is first scaled by a factor 2 and then quantized in 3 bits between 0 and 1. FIG. 10, for example, includes a table depicting non-limiting examples of suitable parameters that can be used in implementing the system as described herein.

Since a max-pooling operation in layers C1 810 or C2 812 only takes the maximum value from a local patch, the C1/C2 layer hence has the same quantization level as S1/S2. As a result, the template weights of the ART layer S2 804 are binary, and the template weights of ARTMAP layer S3 806 are 3 bits.

Incremental learning can include complete incremental learning and semi incremental learning. In complete incremental learning, images are incrementally learned one by one from Input layer through end layer S3 806. In semi incremental learning, some images are pre-learned in ART layer S2 804, and then all images are learned one-by-one through end layer S3 806. Complete incremental learning is equivalent to semi incremental learning where one image is pre-learned.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for online deep learning, the system comprising:
one or more processors and a memory, the memory being a non-transitory computer-readable medium having executable instructions encoded thereon, such that upon execution of the instructions, the one or more processors perform operations of:
generating one or more feature maps by filtering an input image having one or more objects, each feature map having feature values;
generating decreased size feature maps by dividing the one or more feature maps into non-overlapping small regions and pooling the feature values in each small region;
generating a collection of cell maps having connections to the decreased sized feature maps by dividing the decreased size feature maps into overlapping patches, with the overlapping patches being joined together such that overlapping patches centered at a same position across all decreased size feature maps are joined together to connect with a single cell in the same position, with all of the single cells collectively forming the collection of cell maps;
generating a decreased sized collection of cell maps by dividing the collection of cell maps into non-overlapping small regions and pooling feature values in each small region;
mapping the decreased sized collection of cell maps to a single cell using an ARTMAP inference module, the ARTMAP inference module mapping the decreased collection of cell maps to a single cell by performing operations of:
checking whether a winner label matches an input data label:
if they match, then updating a template corresponding to the winner:
otherwise, retrieving a degree-of-match from a degree-of-match generator and checking whether the degree of match for the winner is greater than a threshold:
if so, then doing nothing; and
otherwise, using a new cell to represent the input template and attach the input data label to it; and
generating a class label for the one or more objects based on the single cell.

2. The system as set forth in claim 1, further comprising a degree-of-match generator having a plurality of weakly coupled oscillators for generating a degree-of-match between an input vector and a template, and wherein in forming a collection of cell maps, cells in the same position across decreased size feature maps compete for a winner through the degree-of-match, such that if the winner matches the input vector, a template corresponding to the winner is updated, otherwise a new feature map in the decreased size feature maps is used to represent an input template.

3. The system as set forth in claim 1, wherein a Gabor filter is used to filter the input image.

4. A method for online deep learning, the method comprising causing one or more processors to execute instructions encoded on a non-transitory computer-readable medium, such that upon execution of the instructions, the one or more processors perform acts of:
generating one or more feature maps by filtering an input image having one or more objects, each feature map having feature values;

generating decreased size feature maps by dividing the one or more feature maps into non-overlapping small regions and pooling the feature values in each small region;

generating a collection of cell maps having connections to the decreased sized feature maps by dividing the decreased size feature maps into overlapping patches, with the overlapping patches being joined together such that overlapping patches centered at a same position across all decreased size feature maps are joined together to connect with a single cell in the same position, with all of the single cells collectively forming the collection of cell maps;

generating a decreased sized collection of cell maps by dividing the collection of cell maps into non-overlapping small regions and pooling feature values in each small region;

mapping the decreased sized collection of cell maps to a single cell using an ARTMAP inference module, the ARTMAP inference module mapping the decreased collection of cell maps to a single cell by performing operations of:

checking whether a winner label matches an input data label:

if they match, then u dating a template corresponding to the winner:

otherwise, retrieving a degree-of-match from a degree-of-match generator and checking whether the degree of match for the winner is greater than a threshold;

if so, then doing nothing; and otherwise, using a new cell to represent the input template and attach the input data label to it; and generating a class label for the one or more objects based on the single cell.

5. The method as set forth in claim 4, further comprising an operation of using degree-of-match generator having a plurality of weakly coupled oscillators to generate a degree-of-match between an input vector and a template, and wherein in forming a collection of cell maps, cells in the same position across decreased size feature maps compete for a winner, such that if the winner matches an input vector, a template corresponding to the winner is updated, otherwise a new feature map in the decreased size feature maps is used to represent an input template.

6. The method as set forth in claim 4, wherein a Gabor filter is used to filter the input image.

7. A computer program product for online deep learning, the computer program product comprising:

a non-transitory computer-readable medium having executable instructions encoded thereon, such that upon execution of the instructions by one or more processors, the one or more processors perform operations of:

generating one or more feature maps by filtering an input image having one or more objets, each feature map having feature values;

generating decreased size feature maps by dividing the one or more feature maps into non-overlapping small regions and pooling the feature values in each small region;

generating a collection of cell maps having connections to the decreased sized feature maps by dividing the decreased size feature maps into overlapping patches, with the overlapping patches being joined together such that overlapping patches centered at a same position across all decreased size feature maps are joined together to connect with a single cell in the same position, with all of the single cells collectively forming the collection of cell maps;

generating a decreased sized collection of cell maps by dividing the collection of cell maps into non-overlapping small regions and pooling feature values in each small region;

mapping the decreased sized collection of cell maps to a single cell using an ARTMAP inference module, the ARTMAP inference module mapping the decreased collection of cell maps to a single cell by performing operations of:

checking whether a winner label matches an input data label;

if they match, then updating a template corresponding to the winner;

otherwise, retrieving a degree-of-match from a degree-of-match generator and checking whether the degree of match for the winner is greater than a threshold;

if so, then doing nothing; and otherwise, using a new cell to represent the input template and attach the input data label to it; and generating a class label for the one or more objects based on the single cell.

8. The computer program product as set forth in claim 7, further comprising instructions for causing the one or more processors to receive, from a degree-of-match generator, a degree-of-match between an input vector and a template, and wherein in forming a collection of cell maps, cells in the same position across decreased size feature maps compete for a winner, such that if the winner matches an input vector, a template corresponding to the winner is updated, otherwise a new feature map in the decreased size feature maps is used to represent an input template.

9. The computer program product as set forth in claim 7, wherein a Gabor filter is used to filter the input image.

* * * * *